US006698853B2

United States Patent
Chen et al.

(10) Patent No.: US 6,698,853 B2
(45) Date of Patent: Mar. 2, 2004

(54) COMPUTER ENCLOSURE WITH LOCKING DEVICE

(75) Inventors: Yun Lung Chen, Taipei (TW); Kuo Chih Lin, Taipei (TW); Jung Chi Chen, Taipei (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/745,539

(22) Filed: Dec. 20, 2000

(65) Prior Publication Data

US 2002/0074911 A1 Jun. 20, 2002

(51) Int. Cl.[7] ............................................... A47B 47/00
(52) U.S. Cl. .................... 312/263; 312/223.2; 292/202
(58) Field of Search ..................... 312/223.1, 223.2, 312/263, 265.5, 265.6; 361/683, 684, 685, 724, 725, 726, 727; 292/200, 202, 203, 240, 218, 241

(56) References Cited

U.S. PATENT DOCUMENTS

| | | | | |
|---|---|---|---|---|
| 3,863,762 A | * | 2/1975 | Arai | 292/218 |
| 4,052,093 A | * | 10/1977 | Fattori | 292/218 |
| 5,417,012 A | * | 5/1995 | Brightman et al. | 312/223.2 X |
| 5,451,379 A | * | 9/1995 | Bowlin, Jr. | 292/218 |
| 5,593,219 A | * | 1/1997 | Ho | 312/223.1 X |
| 5,630,632 A | * | 5/1997 | Swan | 292/202 X |
| 5,761,045 A | * | 6/1998 | Olson et al. | 312/223.2 X |
| 5,825,626 A | * | 10/1998 | Hulick et al. | 312/223.2 X |
| 5,967,633 A | * | 10/1999 | Jung | 312/223.2 |
| 6,073,792 A | * | 6/2000 | Campbell et al. | 292/202 X |
| 6,161,909 A | * | 12/2000 | Huang | 312/223.2 |
| 6,209,975 B1 | * | 4/2001 | Lai | 312/223.2 |
| 6,224,118 B1 | * | 5/2001 | Ashford | 292/202 |
| 6,231,140 B1 | * | 5/2001 | Chen | 312/223.2 |
| 6,231,144 B1 | * | 5/2001 | Chen et al. | 312/223.2 X |

FOREIGN PATENT DOCUMENTS

EP 0923019 * 6/1999

* cited by examiner

Primary Examiner—Lanna Mai
Assistant Examiner—Hanh V. Tran
(74) Attorney, Agent, or Firm—Wei Te Chung

(57) ABSTRACT

A computer enclosure (1) includes a chassis (10), a cover (20), a turn support (40) and a locking device (50). The chassis defines a plurality of slots (17) in a pair of opposite sills (16) thereof. The cover has a plurality of catches (21) for the engagement with the chassis at the slots. The turn support is attached to the chassis. The locking device includes a turn cap (60), a cam (52), a washer (54), and a bolt (56). The turn cap and cam are rotatably secured to the cover with the washer and the bolt. Rotation of the turn cap causes corresponding rotation of the cam. When rotated, the cam acts on flanges (46, 48) at an opening (42) of the turn support. The locking device thereby drives the cover to move forward or rearward. The catches of the cover accordingly engage with or disengage from the chassis.

10 Claims, 7 Drawing Sheets

COMPUTER ENCLOSURE WITH LOCKING DEVICE

BACKGROUND

1. Field of the Invention

The present invention relates to a computer enclosure, and particularly to a computer enclosure having a locking device for readily attaching a panel to the computer enclosure and removing the panel therefrom.

2. Related Art

Users of computers want to easily install a side panel or a top panel to a computer enclosure. Typically, a panel is attached to a computer enclosure with screws or bolts. This makes installation or removal of the panel unduly cumbersome and time-consuming.

Thus an improved means of attachment has been developed. A panel of a computer enclosure has a plurality of catches at opposite sides thereof. The catches engage with a plurality of slots defined in sides of the computer enclosure. The panel is slidingly attached to the enclosure. However, a user is generally required to employ both hands to horizontally push the panel along the computer enclosure. This makes the attachment process unduly cumbersome and laborious.

Therefore, a locking device for a computer enclosure which overcomes the above-mentioned problems is desired.

SUMMARY OF THE INVENTION

Accordingly, an object of the present invention is to provide a computer enclosure having a locking device which readily attaches a panel to a computer enclosure and readily removes the panel therefrom.

To achieve the above-mentioned object, a computer enclosure in accordance with the present invention comprises a chassis, a cover, a turn support and a locking device. The chassis defines a plurality of slots in a pair of opposite sills thereof. The cover has a plurality of catches, for engagement with the chassis at the slots. The turn support is attached to the chassis. The locking device includes a turn cap, a cam, a washer, and a bolt. The turn cap is placed in a receiving dish of the cover. The bolt fixes the cam and the washer to a bottom of the turn cap. The cam extends through a through hole of the receiving dish. Rotation of the turn cap causes corresponding rotation of the cam. When rotated, the cam acts on flanges at an opening of the turn support. The locking device thereby drives the cover to move forward or rearward. The catches of the cover accordingly engage with or disengage from the chassis at the slots.

Other objects, advantages and novel features of the present invention will be drawn from the following detailed embodiment of the present invention with attached drawings, in which:

DESCRIPTION OF THE PREFERRED EMBODIMENT

Figure 1:
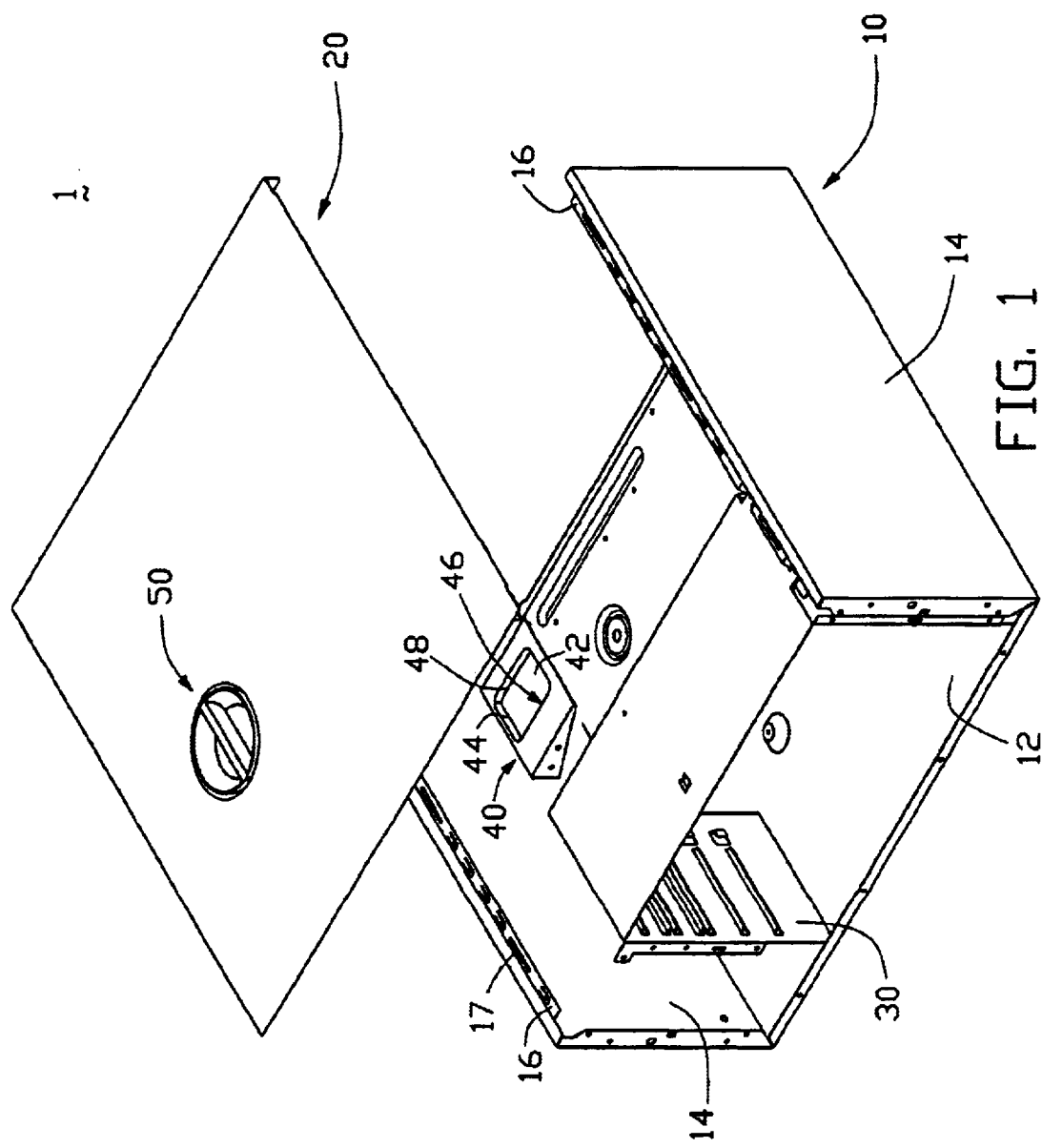
FIG. 1 is an exploded view of a computer enclosure of the present invention.

Referring to FIG. 1, a computer enclosure 1 of the present invention comprises a chassis 10, a cover 20, a turn support 40, and a locking device 50 attached to the cover 20.

The chassis 10 comprises a base 12 and two side walls 14 extending upwardly from the base 12, all of which together define a space (not labeled) therebetween. A pair of sills 16 extends perpendicularly inwardly from top portions of the side walls 14 respectively. A plurality of spaced slots 17 is defined in each sill 16. A drive bracket 30 is mounted into the space of the chassis 10 at a front portion of the chassis 10. The turn support 40 is a metal plate, and is mounted to an upper rear portion of the drive bracket 30 by conventional means. A rectangular opening 42 is defined in a center portion of the turn support 40. A support member 44 depends from the turn support 40 at the opening 42. The support member 44 comprises a pair of opposite first and second transverse flanges 46, 48, and a pair of opposite lateral portions (not labeled). A length of the first or second transverse flange 46, 48 is greater than a length of either lateral portion (not labeled). A plurality of catches 21 is formed on an underside of the cover 20 at opposite lateral sides thereof (see FIG. 3), corresponding to the slots 17 of the chassis 10.

Figure 2:
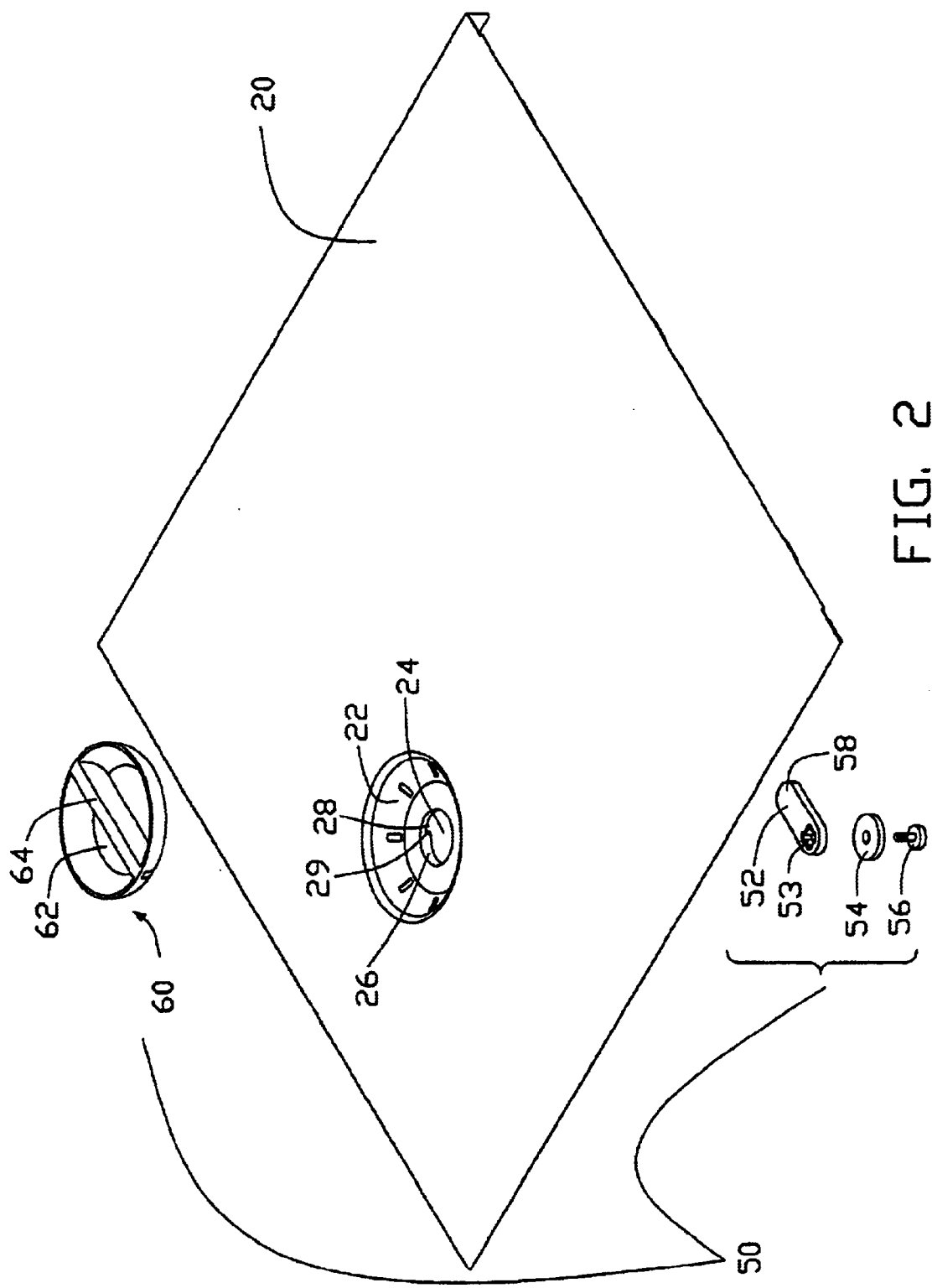
FIG. 2 is an exploded view of a cover and a locking device of the present invention.
Figure 3:
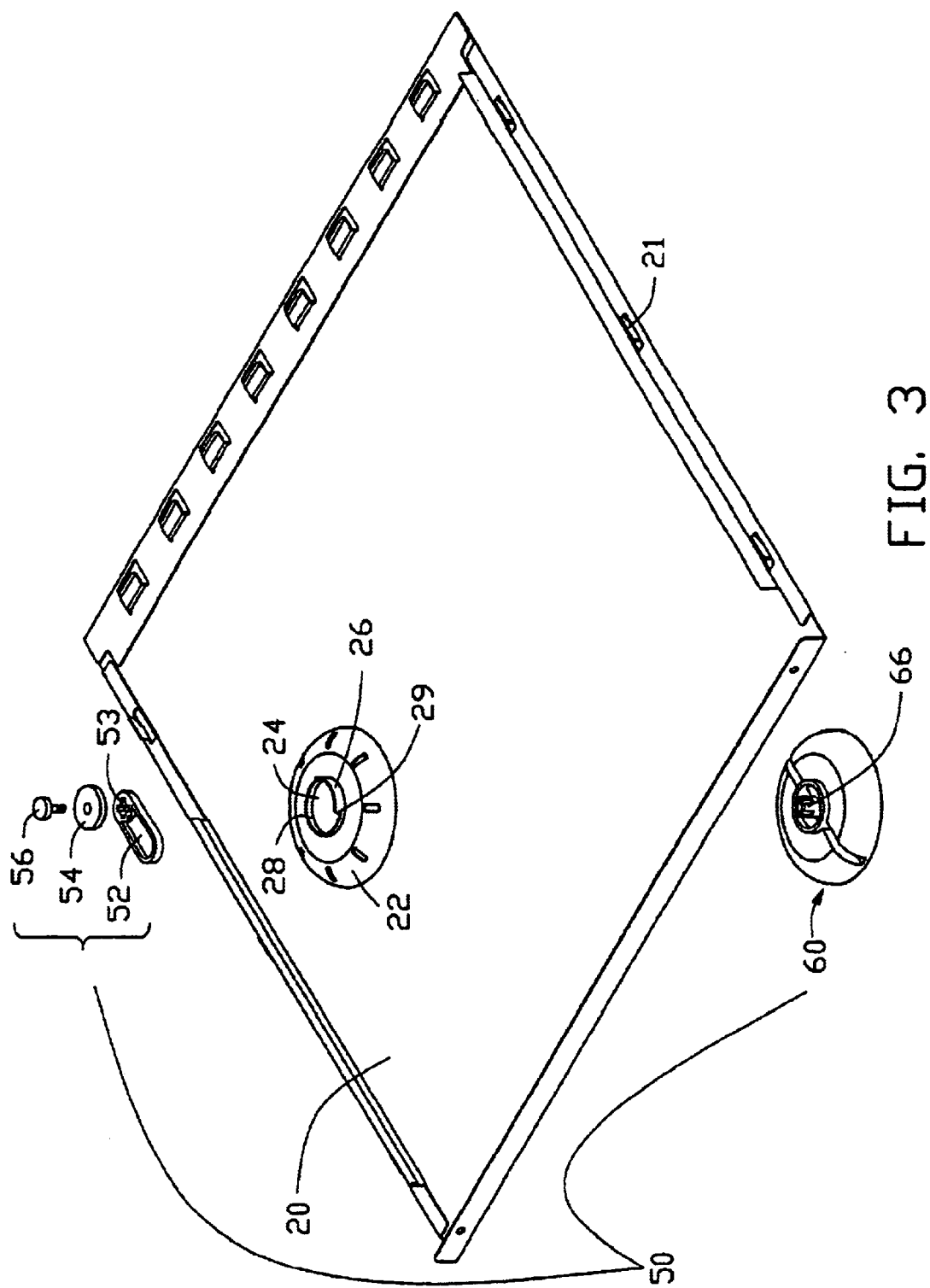
FIG. 3 is an inverted view of FIG. 2.

Referring also to FIGS. 2 and 3, the locking device 50 comprises a turn cap 60, a cam 52, a washer 54, and a bolt 56. The turn cap 60 defines a recess 62 in a top portion thereof, and forms a handle 64 traversing a center of the recess 62. A splined protrusion 66 is formed at a center portion of a bottom surface of the turn cap 60. The cam 52 is generally box-shaped but with two opposite rounded ends. One rounded end forms a nose 58. A splined through aperture 53 is defined in the cam 52 at the other rounded end thereof.

A receiving dish 22 is stamped downwardly from the cover 20. A through hole 24 is defined in a center of the receiving dish 22. An annulus 26 depends from an edge of the receiving dish 22 at the through hole 24. Slightly more than half of a bottom portion of the annulus 26 is indented, to create a generally semi-cylindrical turning space 28. Thus two stops 29 are formed in the annulus 26, at opposite extremities of the turning space 28 respectively.

Figure 4:
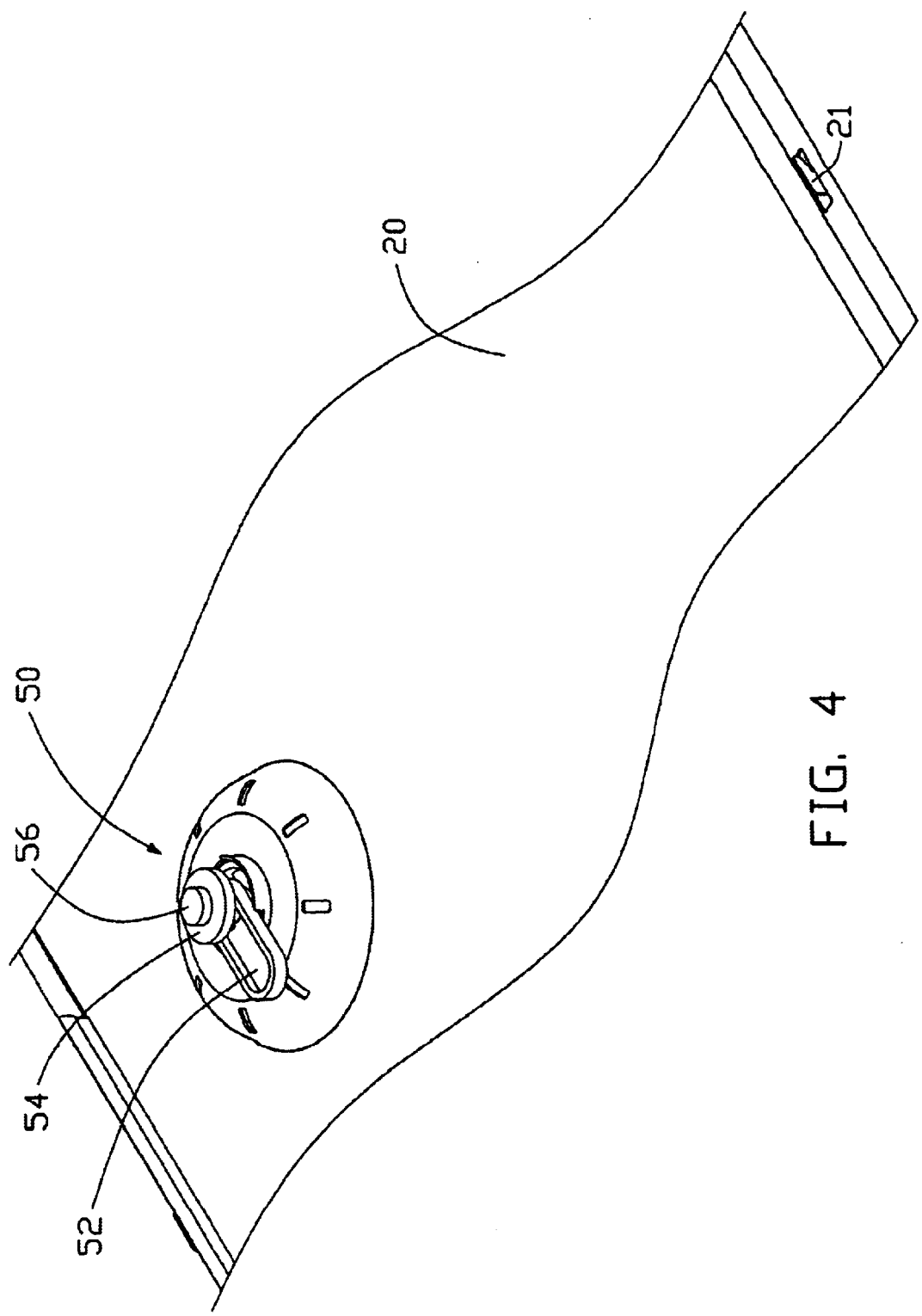
FIG. 4 is an inverted view of the locking device assembled to the cover.

Referring also to FIG. 4, the locking device 50 is assembled to the cover 20. The turn cap 60 is placed in the receiving dish 22 of the cover 20, with the splined protrusion 66 of the turn cap 60 entering the through hole 24 of the receiving dish 22. The cam 52 is placed at an underside of the receiving dish 22, such that the splined protrusion 66 interferentially engages with the aperture 53 of the cam 52. The washer 54 abuts against a bottom of the cam 52, with a central bore (not labeled) of the washer aligning with the aperture 53 of the cam 52. The bolt 56 is extended through the bore and engaged with the splined protrusion 66. The cam 52 is rotatably accommodated in the turning space 28. Thus the locking device 50 is assembled together and attached to the cover 20.

Figure 5:
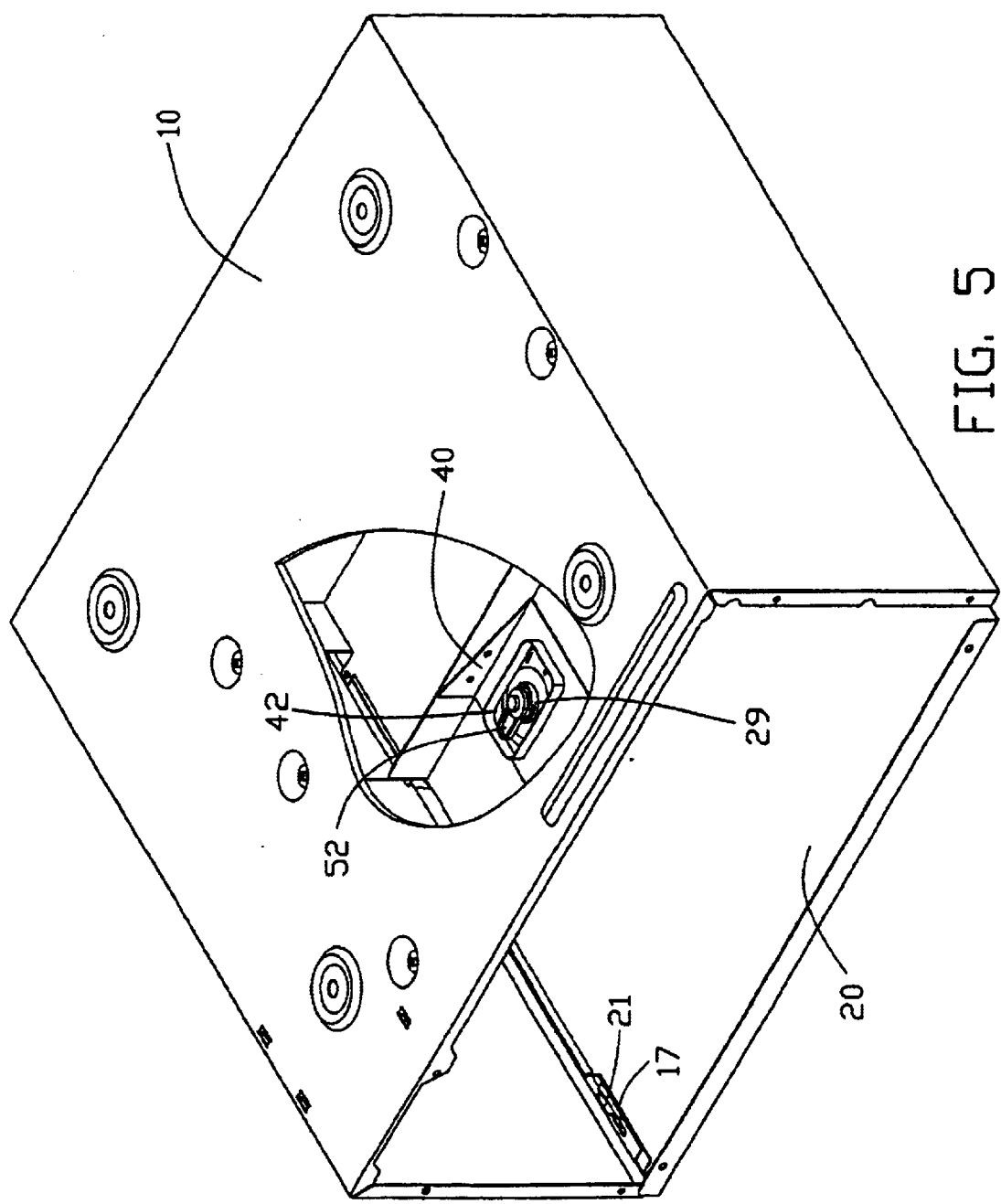
FIG. 5 is an inverted view of the computer enclosure of the present invention assembled together prior to use, with part of a base of a chassis thereof cut away to show details of a turn support thereof and the locking device.

Referring also to FIG. 5, rotation of the handle 64 of the turn cap 60 of the locking device 50 causes corresponding rotation of the cam 52. The cam 52 is rotated so that the nose 58 of the cam 52 points toward either side wall 14 of the chassis 10. The cover 20 is placed on the chassis 10, with the plurality of catches 21 of the cover 20 entering the slots 17 of the chassis 10. The locking device 50 freely protrudes into the opening 42 of the turn support 40.

Figure 6:
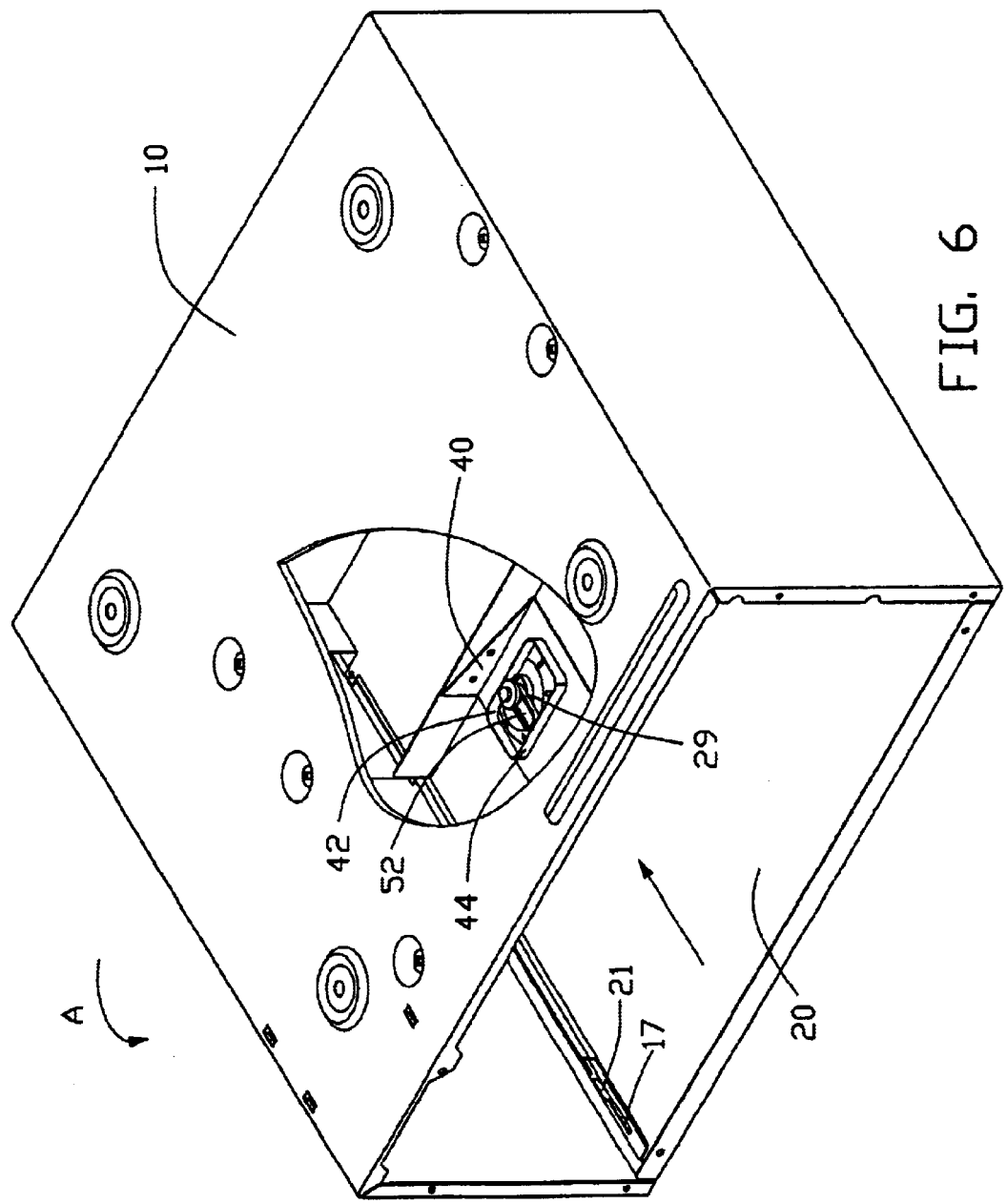
FIG. 6 is similar to FIG. 5, but showing the locking device driving the cover forward to a locked position.

Referring also to FIG. 6, in use, a distance between a center of the locking device 50 and a free end of the nose 58 of the cam 52 is substantially more than half a distance between the first and second transverse flanges 46, 48 of the support member 44 of the turn support 40. The cam 52 is rotated in direction A so that the nose 58 perpendicularly abuts the second transverse flange 48. As a result, the locking device 50 drives the cover 20 to move toward a front of the chassis 10. The catches 21 of the cover 20 respectively engage with the chassis 10 at the slots 17 of the chassis 10. Thus the cover 20 is attached to the chassis 10. The cam 52 is rotated a little further in direction A, until it abuts one stop 29 of the annulus 26 of the cover 20. The cam 52 is locked in such position between the stop 29 and the second transverse flange 48.

Figure 7:
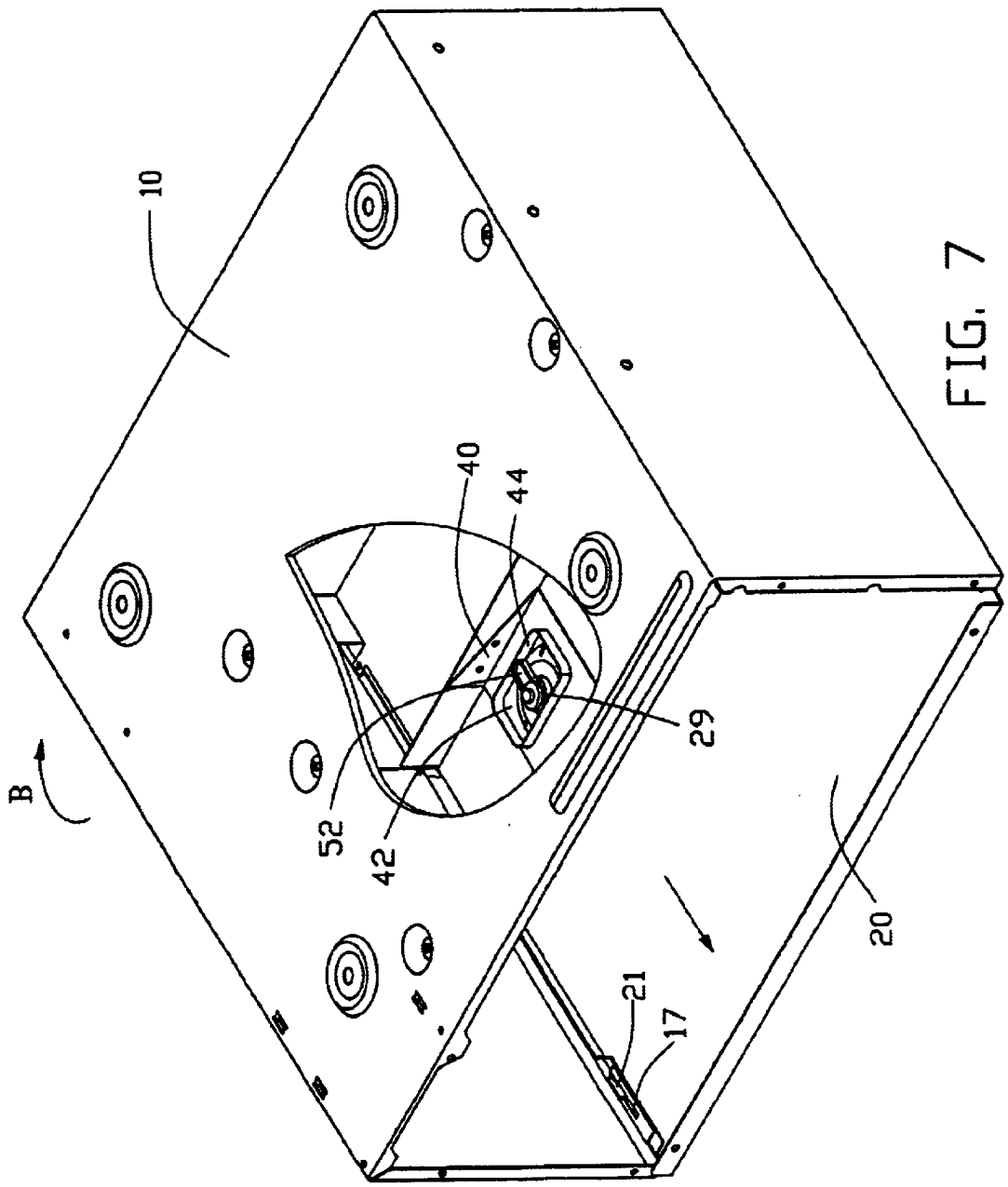
FIG. 7 is similar to FIG. 5, but showing the locking device driving the cover rearward to a released position.

Referring also to FIG. 7, to remove the cover 20 from the chassis 10, the cam 52 is rotated in direction B until the nose 58 perpendicularly abuts the first transverse flange 46 of the support member 44. As a result, the locking device 50 drives the cover 20 to move toward a rear of the chassis. The catches 21 of the cover 20 are released from the chassis 10 at the slots 17. The cover 20 is then easily detached from the chassis 10.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A computer enclosure comprising:
    a chassis having two side walls, each side wall defining at least one slot therein;
    a turn support attached to the chassis and having first and second flanges;
    a cover attached to the chassis, the cover having at least one catch at each side thereof for engaging with the corresponding at least one slot of the chassis, and having a receiving dish with a through hole defined therein; and
    a locking device attached to the cover and having a cam actionable on the first and second flanges of the turn support, wherein the cam drives the cover to move and thereby causes the at least one catch of the cover to engage with or disengage from the chassis at the at least one slot of the chassis.

2. The computer enclosure as described in claim 1, wherein the side walls of the chassis comprise a pair of sills respectively extending inwardly toward each other, each sill defining the at least one slot.

3. The computer enclosure as described in claim 1, wherein an opening is defined in the turn support, and the flanges of the turn support are formed at the opening.

4. The computer enclosure as described in claim 1, wherein the flanges of the turn support are opposed to each other, and a pair of opposite lateral portions is formed on the turn support connecting the flanges, and wherein a length of either flange is greater than a length of either lateral portion.

5. The computer enclosure as described in claim 1, wherein an annulus depends from an edge of the receiving dish of the cover at the through hole.

6. The computer enclosure as described in claim 5, wherein slightly more than half of a bottom portion of the annulus of the cover is indented to create a generally semi-cylindrical turning space for rotatably accommodating the cam of the locking device therein.

7. The computer enclosure as described in claim 1, wherein the locking device further comprises a turn cap placed in the receiving dish of the cover, the cam being attached to a bottom of the turn cap with a washer and a bolt.

8. The computer enclosure as described in claim 7, wherein the turn cap of the locking device has a handle for facilitating manual operation of the locking device, and a protrusion is formed at a bottom surface of the turn cap for engaging with a through aperture of the cam.

9. The computer enclosure as described in claim 6, wherein the annulus of the cover forms two stops at opposite extremities of the turning space respectively, for locking the cam of the locking device in a position whereby the catches of the cover engage with the chassis at the slots of the chassis or in a position whereby the catches of the cover disengage from the chassis at the slots of the chassis.

10. A computer enclosure comprising:
    a chassis having first engaging means;
    a support attached to the chassis, the support having an opening;
    a cover attached to the chassis, the cover having second engaging means;
    a locking device rotatably attached to the cover, the locking device having a cam received in the opening of the support, wherein when the cam rotates toward a first direction and acts on one side of the opening, the cover is moved in a second direction so that the second engaging means of the cover engages with the first engaging means of the chassis, when the cam rotates toward the second direction and acts on an opposite side of the opening, the cover is moved in the first direction so that the second engaging means of the cover disengages from the first engaging means of the chassis.

* * * * *